IMAGE TRANSFER PRINTING METHOD

Filed March 8, 1971

GILBERT D. SPRINGER
INVENTOR

BY Kolisch + Hartwell

ATTY.

3,740,265
Patented June 19, 1973

3,740,265

IMAGE TRANSFER PRINTING METHOD

Gilbert D. Springer, Portland, Oreg., assignor to United Medical Laboratories, Inc., Portland, Oreg.

Filed Mar. 8, 1971, Ser. No. 121,846
Int. Cl. H01f *10/00*
U.S. Cl. 117—235 4 Claims

ABSTRACT OF THE DISCLOSURE

An image transfer printing method and printer wherein character images representing information to be printed are magnetically encoded upon a magnetic medium or record such as a magnetic tape. The magnetic record is subsequently exposed to an environment of magnetizable particles wherein the particles adhere to the magnetized portions of the record and develop character images thereon. The magnetic record is then advanced to an image transfer station where a pressure plate or other suitable device associates the tape with a record sheet and the magnetizable particles are transferred to the record sheet forming printed characters. The images on the magnetic record can then be demagnetized or erased during the transfer operation to enhance transfer of the particles, and the character images formed on the record sheet can be fixed thereon to form a permanent copy. The information can be continuously encoded on the magnetic record and transferred to the record sheet a line at a time to form a record sheet with a multiline format.

BACKGROUND OF THE INVENTION

The invention relates to a high speed printer of extremely simple design that is economical to operate. More particularly, the invention concerns an image transfer printer and method of printing wherein magnetic character images are selectively encoded upon a magnetic record or medium, such as a continuously movable magnetic tape. The magnetic record is subsequently exposed to an environment of magnetizable particles whereby the images are developed upon the magnetic record, and the particles forming the images are subsequently transferred from the magnetic record to a record sheet, such as a multiline sheet.

Image transfer printing systems of various configurations are known in the prior art. However, most such systems are of the electrostatic, nonimpact type that include complicated character encoding systems and are expensive to operate. Other image transfer printing systems that use magnetic recording techniques are subject to the disadvantages of impact-type printers and do not provide permanent copies having high character resolution.

SUMMARY OF THE INVENTION

Accordingly, it is an object of the invention to provide an improved image transfer printer and method of printing that overcome the disadvantages of conventional printers.

It is another object of the invention to provide an image transfer printer that is of simple design and is inexpensive to operate.

It is a further object of the invention to provide a high speed image transfer printer that is especially adapted for printing information transmitted over telephone lines or from any other high speed source in the form of a continuous train of coded pulse signals.

It is yet another object of the invention to provide a high speed image transfer printer that is adapted to receive information continuously to be printed in the form of a train of coded pulse signals, and to transfer such information to a record sheet having a multiline format.

It is yet a further object of the invention to provide an image transfer printer utilizing magnetic recording techniques and having multiple copy capability.

These and other objects of the invention are attained with a printing method that includes the steps of selectively encoding magnetic information upon the face of a magnetic medium or record, exposing the magnetic record to an environment of suitable magnetizable particles and subsequently associating the encoded face of the magnetic record with a record sheet to transfer the particles thereto substantially without impact.

The particular printer described utilizes an endless magnetic record, such as a magnetic tape. The magnetic tape is supplied from a tape cartridge and supported on rollers in a continuous loop, and is advanced by one or more tape drives. The tape follows a path through an encoding station, a developing station, and an image transfer station. Information to be printed, such as alphanumeric characters, is received by the encoding station as in the form of a train of pulses. The encoding station includes a multitrack magnetic recording head that is adapted to record or encode magnetic bits upon the tape at selected positions within a standard character matrix to form each given character to be printed. The recording head is electrically controlled by a character generator that assigns the matrix positions for a given character, and the character generator is responsive to a decoder circuit that receives and converts the coded information signals.

After a magnetic character image is formed, the tape is driven through the developing station where it is immersed in a reservoir containing magnetizable particles suspended within a volatile fluid medium. Upon circulation of the fluid medium around the tape, the particles are attracted to the encoded portions of the tape. Upon removal of the tape from the reservoir, the fluid medium volatizes and the magnetizable particles remain adhered to the tape whereby a character image is developed on the tape.

The tape is then advanced to the transfer station where a pressure plate associates the tape with a record sheet and transfers the particles, forming the visible character images, on a line-by-line basis. As the tape is associated with the record sheet, the magnetic images on the tape are erased to enhance the transfer of the magnetizable particles. The particles are fixed upon the record sheet to form permanent copies and the tape is returned to the tape cartridge for reuse.

BRIEF DESCRIPTION OF THE DRAWINGS

Other objects and advantages of the invention will become apparent from the following detailed description of the invention taken in conjunction with the accompanying drawings, wherein.

DETAILED DESCRIPTION OF THE INVENTION

Figures 1, 2, 3, 4, 5:
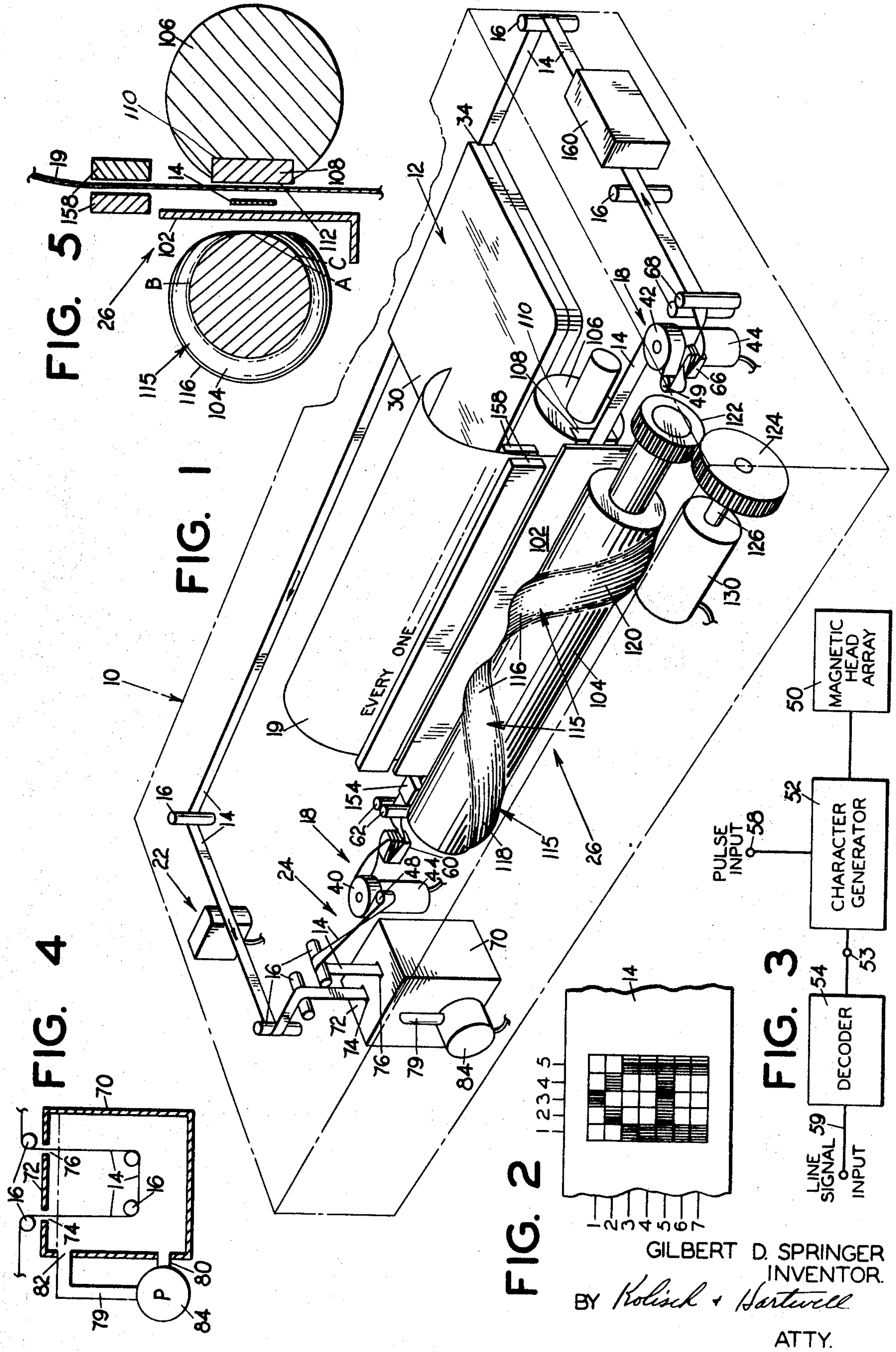
FIG. 1 is a diagrammatic view of an apparatus including the features of the invention.
FIG. 2 is a schematic diagram of a portion of magnetic tape upon which a character matrix is superimposed illustrating the manner of forming character images on the tape.
FIG. 3 is an electrical block diagram of an encoding system usable with the magnetic head array illustrated in FIG. 1.
FIG. 4 is a diagrammatic view, in section of a developing station designed for use in the apparatus of FIG. 1.
FIG. 5 is an enlarged diagrammatic view, in section, of a pressure roller and backing cylinder arrangement comprising a transfer station adapted for use in the apparatus illustrated in FIG. 1.

The invention particularly concerns a method of image transfer printing wherein the information to be printed is magnetically encoded upon a face of a magnetic medium or record. The magnetic record is then exposed to an environment of magnetizable particles. For example, the magnetic record may be immersed in a volatile, nonflammable, nonmagnetic fluid medium having magnetizable particles suspended therein. Upon circulation of the fluid around the magnetic record, the particles become attracted to the encoded portions of the record. Since the nonencoded portions of the magnetic record are substantially uncharged, particles are not attracted thereto. The magnetic record is then withdrawn from the fluid and, upon volatizing of the fluid, magnetizable particles remain adhered only to the encoded portions of the magnetic record.

A record sheet is then positioned adjacent the encoded face of the magnetic record and force is applied to associate the magnetic record with the record sheet to transfer particles therebetween. The magnetizable particles adhere to the record sheet and form an image thereon.

The encoded portions of the magnetic record can be erased with the magnetic record in contact with the record sheet to facilitate free transfer of the particles and the particles can be fixed to the record sheet to form a permanent copy.

Referring now to the drawings, one embodiment of a printer is illustrated for practicing the method of the invention. An image transfer printer 10 generally includes a tape cartridge 12 from which an endless magnetic tape 14 is dispensed. Magnetic tape 14 is supported in a continuous loop, or path, by an arrangement of rollers 16 and is adapted to be driven around the path by tape drive means 18. The tape is advanced progressively along the path through an encoding station 22, a developing station 24 and an image transfer station 26. All of the elements described hereinbefore can be confined within a compact console, such as that illustrated in dotted outline in FIG. 1, although this is not necessary.

Magnetic tape 14 is of conventional construction, comprising for example, a Mylar backing strip upon which a magnetic recording layer, such as ferrous oxide, is deposited. In one embodiment of the invention, a tape of one-half inch width was utilized although tapes of other widths could be used as well. Likewise, other magnetic records such as magnetic cards could be utilized.

Tape cartridge 12 is of conventional design adapted for continuously dispensing tape and includes a system of internal spindles or rollers, adapted to form a roll of tape within housing 30. The roll is suitably supported so that as tape is drawn under tension from the center of the roll and on out through an outfeed slot in the housing, not shown, an incoming portion of the tape is pulled through infeed slot 34 in the housing and wound on the outer periphery of the roll. It should be apparent that other suitable means for confining and dispensing the tape in a continuous manner could be utilized.

Rollers 16 are also of conventional design, being suitably supported on the printer console and adapted to train the tape around the desired path with the ferrous oxide layer exposed to the encoding station, developing station and image transfer station, respectively.

Tape drive means 18 are illustrated including a first drive roller 40 and a second drive roller 42 spaced one on each side of transfer station 26. However, the drive rollers can be arranged at other locations along the tape path without departing from the invention, so long as it is possible to advance the tape along the path in the desired fashion. Each drive roller is mounted on the rotatable shaft of an index motor, such as motor 44. The index motors are of conventional design and are selectively controlled, by means not shown, to advance intermittently or continuously the tape in the direction illustrated by the arrows.

Idler rollers 48, 49 are provided one for each drive roller, with the idler rollers being spaced appropriately to train the tape around a major portion of the periphery of the drive rollers whereby sufficient friction is developed between the back of the tape and the drive rollers to prevent slippage therebetween. Alternatively, magnetic pinch rollers could be provided adjacent each drive roller to positively engage the tape against the drive rollers, although this has not been found to be necessary.

Drive roller 40 is preferably operated in a continuous manner to facilitate continuous recording. However, drive roller 42, is preferably operated intermittently to advance tape 14 one line length at a time to facilitate the line-at-a-time transfer of character images to the record such as sheet 19.

Accordingly, an accumulator 60 is provided downstream of drive roller 40 to momentarily store the tape that accumulates between operating cycles of tape drive 42. Accumulator 60 could be of any suitable design, but is illustrated as comprising a storage capsule or pocket in which the tape leaving drive roller 40 is permitted to drop, folding over upon itself in a loose stack of folds within the capsule.

A set of magnetic pinch rolls 62 is provided downstream of accumulator 60 to train the tape into the transfer station, as it is drawn off the bottom of the stack within the capsule, under the force of drive roller 42.

A similar accumulator 66 and set of pinch rolls 68 are provided downstream of drive roller 42 to handle the portions of tape that are intermittently released from the downstream side of tape drive 42.

The drive rollers could both be operated in an intermittent manner or in a continuous manner without departing from the invention. Furthermore, other systems for advancing the tape could be utilized.

Encoding station 22 is provided downstream of tape cartridge 12 for magnetically recording or encoding character images upon tape 14, such as alphanumeric character images representing the information to be printed. The encoding station includes electrical circuitry such as that illustrated schematically in FIG. 3 comprising a magnetic head array 50 that is electrically controlled by a character generator 52. Character generator 52 is connected to receive an electrical signal on an input terminal 53 from a decoder circuit 54, and a timing or framing signal through an input terminal 58 from a pulse source, not shown. Decoder 54 is adapted to receive an electrical signal representing the information to be printed through an input terminal 59, from a remote source, not illustrated.

In the preferred embodiment, head array 50 is of multi-track configuration including a plurality of magnetic write gaps spaced along corresponding tracks parallel with the direction of tape movement. The write gaps are adapted for recording magnetic bits at selected locations on the magnetic tape to form the desired character images. In the preferred embodiment, each character is formed within a standard 5 x 7 matrix similar to the matrix illustrated in FIG. 2 with the character "A" formed therein. It should be apparent from FIG. 2 that in forming the character A, the track one write gap is actuated to the write mode only as column three of the matrix is adjacent thereto. The track two write gap is actuated to the write mode for columns two and four; the track three write gap is actuated to the write mode for columns one and five, etc., whereby the entire character is formed as the five columns pass the magnetic gaps. In the preferred embodiment, the the write gap for a particular track records six magnetic bits in each block of the matrix for which it is actuated. The magnetic encoding is carried out with a recording current in the order of one milliampere and a recording voltage in the range of two and one-half to five volts. It has been found that track spacings of 0.025 inch and track widths of 0.012 inch result in good resolution in the final printed images. However, it should be understood that a different character matrix, different recording densities within the individual matrix blocks, or other track spacings could be utilized without departing from the invention.

Decoder 54 is adapted to receive serial coded pulse signals representing the information to be printed and convert such signals to a character code that is used to control the particular character generator circuit utilized in the printer. The selection of a character generator circuit depends upon the character format that is desired, as well as upon the matrix configuration in which the characters are formed. In one embodiment, a conventional decoder was utilized to convert incoming signals to a six bit code used to control the character generator. A read only memory-type character generator was used to convert the six bit coded signals to a standard alphanumeric 64 character font especially adapted for the 5 x 7 character matrix utilized in the printer. However, other character fonts or matrix configurations could be used, provided that suitable decoder and character generator circuits were provided therefor. It should be understood that other systems for encoding magnetic information upon a magnetic record or medium could be used as well.

After the character encoding operation, tape 14 is advanced through developing station 24 where the tape is exposed to an environment of magnetizable particles suspended within a fluid medium. Referring particularly to FIG. 4, a reservoir 70 is diagrammatically illustrated with a top 72 having a tape infeed slot 74 and a tape outfeed slot 76 formed therein. The reservoir is adapted to confine a supply of fluid medium in which magnetizable particles are suspended. The fluid medium is illustrated as filling the reservoir to a moderate level whereby the tape is fully immersed when trained about rollers 16 provided within the reservoir. A fluid recirculating tube 79 is provided in the reservoir, including an outlet duct 82 that communicates with the upper level of the reservoir and an inlet duct 80 that communicates with the lower level of the reservoir. A pump 84 is provided in tube 79 adapted to be selectively operated by a motor, not shown, whereby the fluid medium in the reservoir is adequately recirculated.

The fluid medium should be a volatile, nonflammable, nonmagnetic material in which many relatively small magnetizable particles can be held in suspension with the fluid medium under recirculation. Water is a suitable material. However, it has been found that a material marketed by 3M Company under the tradename "Flourinert," or a material marketed by C.B.S., Inc., under the tradename "Magna-See" are both preferable to water. These materials have a suitable specific weight to suspend spherical ferrous oxide particles, having diameters ranging between 0.0005 inch and 0.001 inch, that were used in one embodiment of the invention. Freon is also a suitable material, being highly volatile and having a suitable specific gravity to suspend particles of the size mentioned. Freon is particularly suitable for use with ferrous oxide particles since it does not corrode the particles.

Particles of other magnetizable materials with or without special coatings can be used as needed to enhance their transfer and permanence of records for various applications on a record sheet. Different sizes of particles could also be used without departing from the invention. For example, ferroceramic particles could be used. However, it has been found that particles of the size specified above can be suspended within the fluid mediums mentioned whereby the recording surface of the tape is uniformly exposed to the particles, when immeresd. The magnetic forces existing in the encoded portions of the tape are of sufficient strength to attract magnetizable particles of the given size as the fluid circulates around the tape due to the movement of the tape and the action of pump 84. Furthermore, since the nonmagnetized portions of the tape are conductive, static electrical charges such as those charges usually associated with background noise, do not readily appear upon the tape. Therefore, in view of the fluid motion about the tape, particles of the given size do not adhere to the nonencoded regions of the tape. Consequently, with the tape withdrawn from the reservoir and the fluid volatized, only the encoded portions of the tape are left with a coating of magnetizable particles adhered thereto. This results in the production of a final printed copy without background distortion or blurring. However, other means could be used for exposing the magnetic medium or record to magnetizable particles without departing from the invention.

With the character images developed upon the magnetic tape, the tape is advanced to transfer station 26 where the character images are transferred from the tape to a record sheet, such as sheet 19. Sheet 19 can be of standard paper and is provided from a continuous roll of perforated flat forms, not shown, located below the transfer station. Suitable tractor means of conventional design, not shown, are provided for indexing sheet 19 one line at a time in an upward direction, as required for the preferred mode of line-at-a-time printing. However, it should be apparent that other sheet control means could be provided, if character-at-a-time image transfer is utilized, for example.

Transfer station 26 (and particular reference is made to FIGS. 1 and 5), further includes a pressure plate 102 and a pressure roller 104 positioned on one side of tape 14, and a backing cylinder 106 positioned on the other side of tape 14.

Pressure plate 102 is of elongate form and has an L-shaped cross section that provides rigidity thereto. Plate 102 is positioned in spaced parallel relationship to the section of tape 14 that is positioned in the transfer station. Plate 102 is supported, by means not shown, for movement in a horizontal direction toward or away from the tape as viewed in FIG. 5, for a purpose explained hereinafter.

Pressure roller 104 and backing cylinder 106 are of generally cylindrical form and are positioned in spaced, opposed relationship parallel to tape 14. An insert 108 of permanent magnetic material is secured in an appropriate slot 110 formed in cylinder 106 extending the full length thereof. Insert 108 is formed with a flat surface 112 thereon, and cylinder 106 is fixedly positioned at the transfer station, by means not shown, so that flat surface 112 faces roller 104.

A raised cam 115 is formed on the surface of roller 104, having a flat upper surface 116 adapted to contact the back of plate 102 as roller 104 rotates. Cam 115 includes a first portion 118 that begins at the center of roller 104, and extends along a left handed helical path around the roller surface to terminate at the left end of roller 104 as viewed in FIG. 1. Cam 115 also includes a second portion 120 that is a mirror image of portion 118, beginning at the center of roller 104, extending along a right handed helical path around the roller surface and terminating at the right end of the roller as viewed in FIG. 1.

As is apparent from FIG. 5, the upper surface 116 of each of portions 118, 120 of the cam describe a path or outline that diverges away from the roller surface along a counterclockwise path between points A and B on the roller surface. Between points B and C on the roller surface, upper surface 116 follows a generally circular outline, and between points C and A surface 116 converges toward the roller surface.

Roller 104 is rotatably supported, by means not shown, and a gear 122 is provided at one end of the roller. Gear 122 is adapted to engage a drive gear 124 that is secured to a shaft 126 of an index motor 130. Index motor 130 is adapted to be selectively energized by means not shown, whereby roller 104 is rotated through one revolution and stopped. Suitable electrical control means can be provided to brake motor 130 and roller 104 as the roller returns to its normal rest position so that accurate control is maintained. As roller 104 rotates, cam surface 116 is brought into contact with pressure plate 102 and forces the pressue plate, as well as tape 14 and record sheet 19, into contact with surface 112 of the backing cylinder insert. Due to the helical configuration of cam 115, force is initially exerted by the cam surface at the center of the pressure plate. Then, the point of application of the force is moved from the center of the plate toward both ends thereof. This serves to apply force between pressure plate 102 and surface 112 sufficient to transfer the magnetizable particles from tape 14 to sheet 19. Furthermore, the force is momentarily intensified at points that move from the center to the outer ends of roller 104 as the cam surface slides along the pressure plate. This further serves to enhance the transfer of magnetizable particles to the record sheet.

The transfer of particles is also positively affected by movement of tape 14 into the magnetic field of insert 108. This serves to demagnetize the magnetic character encoded portions of tape 14 and release the magnetic particles therefrom.

It should be noted that the tape is brought into contact with the record sheet substantially without impact. This results in smoother operation a the transfer station and low wear and maintenance of the mechanical elements involved. Impact type contact could be used to transfer the particles although such is not preferred. Likewise, other low-impact means for transferring the particles to the sheet could be used without departing from the invention.

Sensing means 154 of conventional design are provided at the left end of the transfer station, as viewed in FIG. 1, for monitoring the movement of tape 14 past the transfer station. Sensing means 154 produce an electrical signal that is supplied to control means, not shown, for coordination of the movement of tape 14 past the transfer station, the recording station, and the developing station, respectively. The tape movement is also synchronized with the upward advance of the record sheet using conventional techniques. The sensing means can be adapted to detect magnetic framing marks on the tape, or it can sense pre-punched framing holes in the tape such as by means of photo-detection techniques. The latter approach is preferred since it provides more positive synchronization of the tape movement with the movement of the record sheet.

The transfer station further includes fixing means 158 positioned on either side of record 19 above the pressure plate. The fixing means serve to fix or secure permanently the particles comprising the printed image upon sheet 19 to produce a permanent copy. The fixing means can take several forms depending upon the type of record being employed.

In one preferred embodiment, sheet 19 comprises a standard paper covered with a thermoplastic wax coating. Accordingly, means 158 comprise an electrically energized Nichrome wire, located adjacent the sheet to provide sufficient heat to flow the wax and fix the magnetizable particles to the paper. It has been found that heating of the wax to about 120° F. is sufficient for this purpose.

In another embodiment of the invention, standard paper was coated with polyethylene type plastic having a low melting point, for example in the range of 125° F., and an energized Nichrome wire located adjacent to the paper was sufficient to melt the plastic and fix the magnetizable particles therein.

Alternatively, it is possible to transfer the magnetizable partciles in a dry state to a standard paper, and to spray the paper with a fast setting aerosol spray comprising a solution of transparent resinous material such as a solution of polyacrylate resin. Such forms a thin film on the sheet and on drying sets the particles. It is also possible to apply such material to the paper by rolling or dipping techniques, without departing from the invention. When thermoplastic covered particles are utilized, such particles can be fixed on the record sheet by application of heat during or after the transfer of the particles.

Tape cleaning means 160 are provided adjacent tape 14 downstream from the transfer station to demagnetize or erase any remaining magnetic images on the tape and to eliminate any remaining magnetizable particles therefrom. Accordingly, cleaning means 160 can include both a magnetic erase head and a roller, or brush, to apply cleaning solvent to the tape. The solvent can comprise the same material utilized at the developing station to suspend the magnetizable particles.

In the operation of the preferred embodiment of the printer, magnetic tape 14 is continuously driven past the recording station and through the developing station by means of drive roller 40. The information to be printed is received by the decoder from a remote line source, such as a telephone input or other switch source and is utilized to control the magnetic head array for recording the information character upon tape 14. The magnetic character images are developed to a visible outline or form in the developing station by application of magnetizable particles thereto. As tape 14 leaves the developing station, the fluid medium volatizes rapidly with the magnetizable particles remaining adhered only upon the encoded portions on the tape.

If a line-at-a-time image transfer operation is utilized, tape 14 is advanced continuously by tape drive 40 and a blocklog of tape is accumulated on the downstream side of the tape drive. Tape drive 42 then advances increments or sections of the tape that correspond to one line length, in between each transfer operation. Thus, a one line length section of tape 14 is positioned adjacent pressure plate 102, pressure roller 104 is rotated through one revolution effecting transfer of the character images contained on that section of tape, and the tape is released and advanced by a second line length during an interval that sheet 19 is incremented upwardly by one line width.

After transfer of the images each section of tape 14 is erased and cleaned prior to its return to the tape cartridge for reuse. The character images placed upon sheet 19 are fixed by fixing means 158 and the sheet is available for conventional use.

If multiple copies are desired, the encoded tape can be shielded from the magnetic field of insert 108 by suitable means and the cleaning means not utilized. Thus, the character images on the tape are not erased and a sufficient number of particles are retained upon the tape to produce several additional legible copies if the tape is recirculated.

The printer described hereinbefore has a number of advantages that are not present in other image transfer printers known in the prior art. Thus, the printer is of extremely simple design and has low manufacturing and maintenance costs. In addition, the materials utilized for printing are of low cost and the printer is economical to operate. Operational speeds are attainable which enable the use of the printer for on-line applications in conjunction with telephonic transmission equipment, although this is not necessary. In view of the use of a fluid or other suitable medium in the application of magnetizable particles to the tape, a higher concentration of particles is attained on the encoded portions of the tape without noticeable background blurring on the nonencoded portions. Consequently, the printer is also particularly susceptible of use with different character formats, providing high resolution without objectionable background distortion even when smaller character formats are used.

It is claimed and desired to secure by Letters Patent:

1. In an image transfer printing process which includes the steps of selectively encoding magnetic bits forming one or more character images upon a face of a magnetic record, and exposing the mangetic record to an environment of mangetizable particles whereby such particles adhere to the encoded character images, the method comprising positioning an elongate record sheet having opposed side margins adjacent the encoded face of said magnetic record, and with the application of pressure transferring particles from said mangetic record to said record sheet to form character images on said sheet, said pressure being applied through the operation of supporting an expanse of said record sheet which extends transversely of the record sheet between its side edges adjacent an aligned expanse of said record and then moving along said expanses while so supported a region of intensified localized pressure which forces the sheet and record into intimate pressurized contact at the location of said region, the transfer being performed to produce successive laterally spaced lines of character images on said sheet by repeatedly performing the operation of first supporting the expanse of sheet adjacent the expanse of record and then moving the region of localized intensified pressure, the sheet between each such operation being moved incrementally in a direction normal to its side edges.

2. The method of claim 1, wherein after the transfer of particles to said sheet, the application of pressure is relaxed, and the sheet is moved relative to the record in a direction normal to said expanses to place a fresh expanse of the sheet in a position where such is supported adjacent an aligned expanse of said record.

3. The method of claim 1, wherein said record comprises an elongate magnetic tape, and wherein said expanse of said tape comprises an elongate section of the length of the tape which is positioned to extend transversely between the sheet's opposed side margins.

4. The method of printing comprising forming an elongate pattern of images extending along an elongate tape with such images being defined by magnetizable particles held to the tape magnetically, positioning successive sections of the tape with such disposed in a course extending transversely of the side margins of an elongate copy sheet, positioning adjacent and in alignment with respective sections of the tape successive expanses of the copy sheet, said sheet expanses extending between side margins of the copy sheet and being laterally offset from each other in a direction extending normal to the edges of the sheet, and transferring particles held on each section of tape to an aligned expanse of the copy sheet by moving along the expanse an intensified region of localized pressure effective to force said sheet and tape into intimate pressurized contact at the location of said region.

References Cited

UNITED STATES PATENTS

| | | | |
|---|---|---|---|
| 2,954,006 | 9/1960 | Lawrence | 117—239 X |
| 3,526,191 | 9/1970 | Silverberg | 117—235 UX |
| 3,627,682 | 12/1971 | Hall et al. | 117—235 X |
| 2,857,290 | 10/1958 | Bolton | 117—238 X |

RALPH HUSACK, Primary Examiner

B. D. PIANALTO, Assistant Examiner

U.S. Cl. X.R.

117—17.5; 118—637, 639

UNITED STATES PATENT OFFICE
CERTIFICATE OF CORRECTION

Patent No. 3,740,265 Dated June 19, 1973

Inventor(s) Gilbert D. Springer

It is certified that error appears in the above-identified patent and that said Letters Patent are hereby corrected as shown below:

In column 9, line 13 "edges" should read --margins--;

Signed and sealed this 15th day of April 1975.

([illegible])
Attest:

[illegible] C. [illegible]
Attesting Officer

C. [illegible]
Commissioner of Patents
and Trademarks

RM PO-1050 (10-69)
USCOMM-DC 60376-P69
★ U.S. GOVERNMENT PRINTING OFFICE : 1969 O—366-334.